(12) United States Patent
Eickhoff

(10) Patent No.: US 7,820,312 B2
(45) Date of Patent: Oct. 26, 2010

(54) VARIABLE POWER MICRO POWER GENERATOR

(75) Inventor: Steven J. Eickhoff, Plymouth, MN (US)

(73) Assignee: Honeywell International Inc., Morristown, NJ (US)

(*) Notice: Subject to any disclaimer, the term of this patent is extended or adjusted under 35 U.S.C. 154(b) by 441 days.

(21) Appl. No.: 11/394,583

(22) Filed: Mar. 31, 2006

(65) Prior Publication Data

US 2007/0231618 A1 Oct. 4, 2007

(51) Int. Cl.
*H01M 12/00* (2006.01)
*H01M 10/44* (2006.01)

(52) U.S. Cl. .............. 429/9; 429/34; 429/52

(58) Field of Classification Search ............. None
See application file for complete search history.

(56) References Cited

U.S. PATENT DOCUMENTS

| | | | | |
|---|---|---|---|---|
| 2004/0081867 A1* | 4/2004 | Edlund | | 429/22 |
| 2005/0014044 A1* | 1/2005 | Thirukkovalur et al. | | 429/26 |
| 2005/0037241 A1* | 2/2005 | Schneider et al. | | 429/9 |
| 2005/0142406 A1 | 6/2005 | Obata et al. | | |
| 2006/0134479 A1* | 6/2006 | Hu et al. | | 429/22 |
| 2006/0204822 A1* | 9/2006 | Shu et al. | | 429/35 |
| 2007/0111061 A1* | 5/2007 | Matsuno et al. | | 429/23 |

FOREIGN PATENT DOCUMENTS

| | | | |
|---|---|---|---|
| EP | 1610406 | * | 6/2004 |
| EP | 1610406 A1 | | 12/2005 |
| WO | WO 02/069427 A2 | | 9/2002 |
| WO | WO 2005/006478 A1 | | 1/2005 |
| WO | WO 2005/083825 | * | 9/2005 |

OTHER PUBLICATIONS

PCT International Search Report corresponding to international application No. PCT/US2007/065603, mailed Sep. 3, 2007.
PCT Written Opinion of the International Searching Authority corresponding to international application No. PCT/US2007/065603, mailed Sep. 3, 2007.

* cited by examiner

*Primary Examiner*—Melvin C Mayes
*Assistant Examiner*—Sheng Han
(74) *Attorney, Agent, or Firm*—Husch Blackwell Welsh Katz

(57) ABSTRACT

A fuel cell based power generator exhibits a plurality of different power outputs. A selection structure carried by the generator facilitates specification of a desired output power.

21 Claims, 2 Drawing Sheets

SELF CONFIGURING VARIABLE POWER MICRO POWER GENERATOR

FLEXIBLE DIAPHRAGM

VARIABLE POWER MICRO POWER GENERATOR

FIELD

The invention pertains to fuel cell based power generators. More particularly, the invention pertains to such power generators which can provide a plurality of electrical outputs, one of which is selectable.

BACKGROUND

Batteries represent a substantial type of business whether for original equipment use or as replacements. Fuel cells may provide an alternative source of electrical energy for certain types of products. However, while batteries can provide a wide range of power levels, and are sold based on capacity, fuel cell based power generators can only provide a relatively narrow range of power levels. This potentially results in a different type of sales model based on power capability and energy capacity.

However given the potential size of the battery market it would be desirable to be able to configure fuel cell based power generators such that they more readily correspond to the current sales model as to how batteries are sold. This has the advantage of potentially reduced market fragmentation and increased acceptance and adoption of fuel cell technologies.

DETAILED DESCRIPTION

Figure 1A:
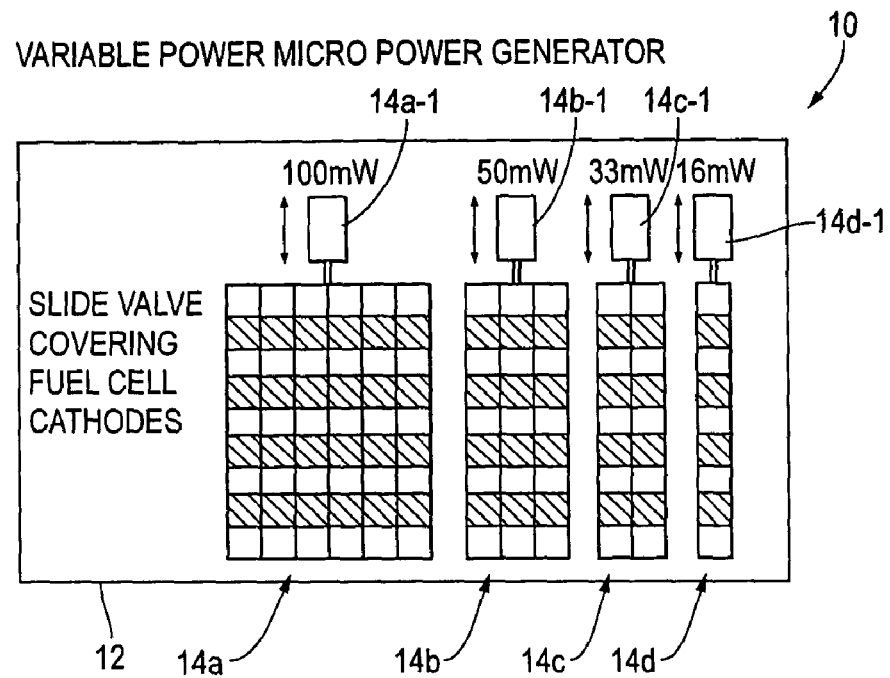
FIG. 1A illustrates one form of a variable power generator in accordance with the invention.

While embodiments of this invention can take many different forms, specific embodiments thereof are shown in the drawings and will be described herein in detail with the understanding that the present disclosure is to be considered as an exemplification of the principles of the invention, as well as the best mode of practicing same, and is not intended to limit the invention to the specific embodiment illustrated.

Embodiments of the present invention include power generators with output power selection structures. For example, in one aspect of the invention, user actuated switches or seals can be provided. The switches or seals mechanically open or seal portions of an array of fuel cell anodes, for example, from a hydrogen source or cathodes from the ambient. The seals prevent their respective cells from contributing to power generation. Advantageously, power generators in accordance with the invention, which make available selectable power outputs, will reduce the number of devices required to energize the multitude of different electronic devices currently available.

It will be understood that the selection structures can be implemented in a variety of configurations without departing from the spirit and scope of the present invention. For example, the switches or seals can be selected, removed or opened manually or automatically.

In another aspect of the invention, variable power generators in accordance with the invention can be automatically configured for use with a selected electrical unit when inserted into the respective unit. The appropriate output power can be selected by mechanically moving a switch or a valve. Alternately, a seal or foil can be torn or removed in the process of inserting the generator into the respective electrical unit.

In yet another aspect of the invention a plurality of fuel cells can be connected in series to achieve a desired output voltage. For example, five or six cells can be connected in series to achieve an output voltage in a range of three to four volts. A plurality of series configurations can be interconnected in parallel to provide additional output current at the common voltage. One plurality or another can be selected by means of an actuated switch, valve or seal which can be actuated or broken to provide the desired output power. Those switches or seals which have not been actuated or disturbed do not contribute to generation of electrical power and do not permeate hydrogen into the ambient atmosphere.

Exemplary configurations include five or six cells in series which can produce an output power of 10 mW. A plurality of such configurations, five or six could be coupled in parallel and provide 50 to 60 mW output. Alternately, each series configuration could produce different output power level. For example, configurations could be provided to produce 5, 10, 10, 25, 25, 50 and 100 mW. In this configuration, power levels from 100 to 200 mW can be provided in 5 mW increments. Other configurations and power output levels come within the spirit and scope of the invention.

In yet another aspect of the invention, self-configuring units can be provided having multiple moveable pins or terminations which can be actuated by an electronic device. For example, each pin or actuator on the generator can be connected to a valve which when activated exposes the respective fuel cell cathode to the ambient, or the fuel cell anode to hydrogen. The pin or moveable member can be activated by the respective electronic device. Inserting the generator into the device actuates the valves associated with the desired output power.

Figure 1B:
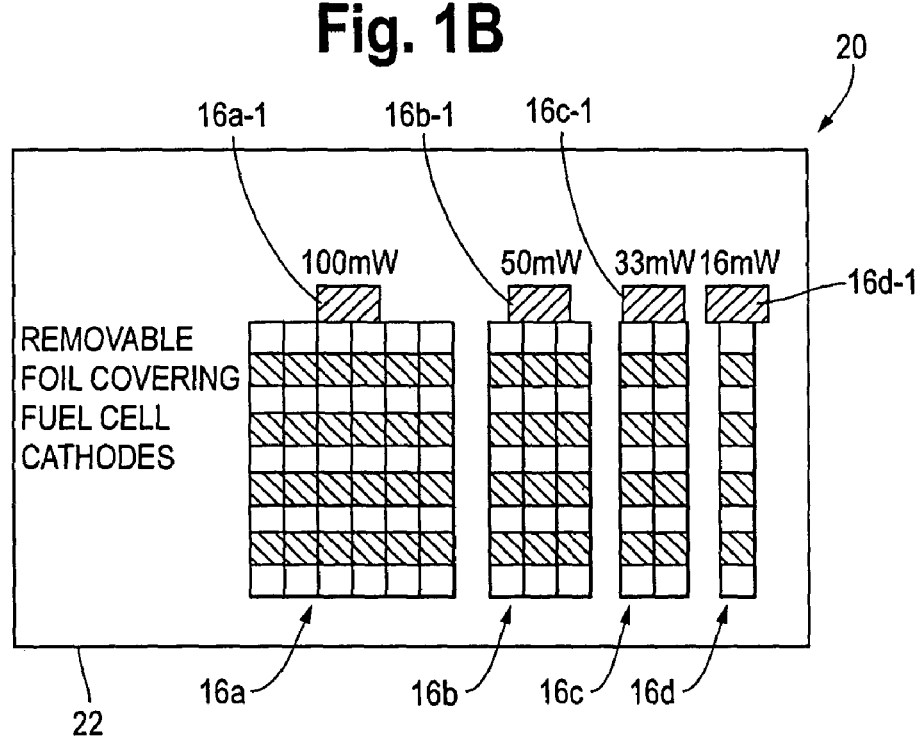
FIG. 1B illustrates a variation on the generator of FIG. 1A.

FIGS. 1A and 1B illustrate two embodiments of the present invention, 10 and 20. Each of the embodiments incorporates a generator having a housing 12, 22 respectively. The dimensions and shape of the respective housing 12, 22 are not limitations of the present invention. They can be dictated for example by the respective electronic units which are to be energized by the respective generator.

Each of generators 10, 20 incorporates a plurality of interconnected fuel cells such as 14a, b, c, d and 16a, b, c, d. One of the combinations of fuel cells 14-i, 16-i can be selected in each of the generators 10, 20 depending on the application. As noted above, by combining several series connected fuel cells in parallel different power outputs can be provided at a common voltage such as 3 to 4 volts.

Cell combinations 14a, 16a for example can provide 100 mW output. Similarly combinations 14c and 16c can provide 33 mW outputs.

In accordance with the invention, a particular fuel cell configuration can be selected either manually or automatically, as discussed subsequently, by displacing a selection member such as 14a-1, 14b-1, 14c-1, and 14d-1. Displacement in any convenient direction relative to the housing 12. One of the fuel cell combinations 14i can be manually or automatically selected by displacing one of the members such as 14a-1 thereby exposing either a respective cathode or anode to the ambient or hydrogen. Other fuel cell combinations in the generator do not contribute to the power output of the selected cell combination.

The selection mechanism of the generator 20 incorporates a plurality of removable or piercable seals or coverings, which could be formed of foil or membrane or the like all without limitation 16a-1, 16b-1, 16c-1, and 16d-1. Analogously to the selection process of the generator 10, one of the covers or foils is pierced, torn or removed to activate a fuel cell combination. For example piercing or removing the respective cover of fuel cell can expose the respective cathodes to the ambient. Alternately, the respective anodes could be exposed to hydrogen.

Figure 2A:
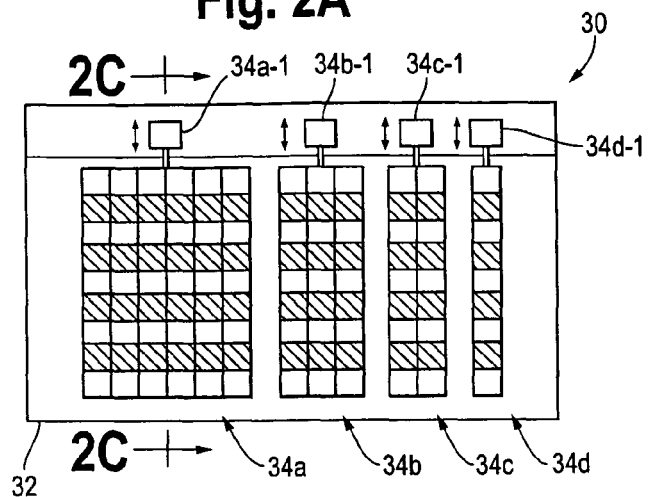
FIG. 2A is a front elevational view of another variable power fuel cell based generator in accordance with the invention.
Figure 2B:
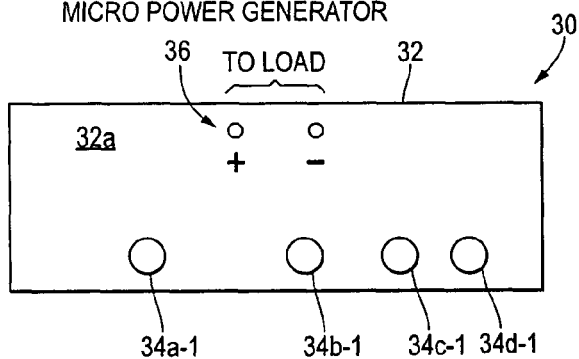
FIG. 2B is a top plan view of the generator of FIG. 2A.
Figure 2C:
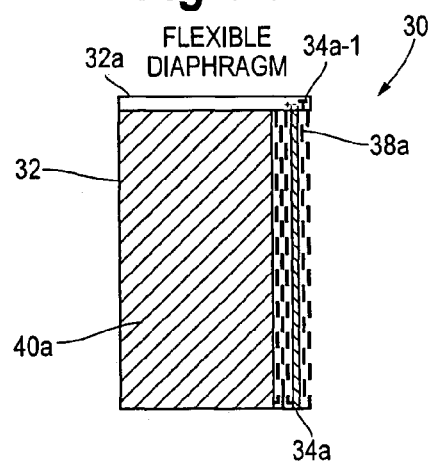
FIG. 2C is a side sectional view taken along plane 2C-2C of FIG. 2A.

FIGS. 2A-2C illustrate a self-configuring form of generator 30 in accordance with the invention. The generator 30, analogously to the generator 10, incorporates a plurality of moveable or operable selection members such as 34a-1, 34b-1, 34c-1 and 34d-1. The associated fuel cell combinations such as 34a, b, c, and d can be selected by deflecting or moving the respective member or pin 34a-1, b-1, c-1 and d-1. This can be accomplished by inserting the housing 32 into the respective electronic unit which in turn then deflects the appropriate valve, pin or selecting member to meet its requirements. Alternately, a respective cover or seal can be opened. Output power can be extracted by terminals 36.

As illustrated in FIG. 2C, the cell configuration 34a can include a common fuel supply 40a, a slidable valve or cover 38a which is coupled to deflect the member or pin 34a-1. Displacing the valve or cover 38a exposes the cathode of the cells 34a to the ambient. Alternately, the anodes can be exposed to the hydrogen fuel 40a.

Figure 3:
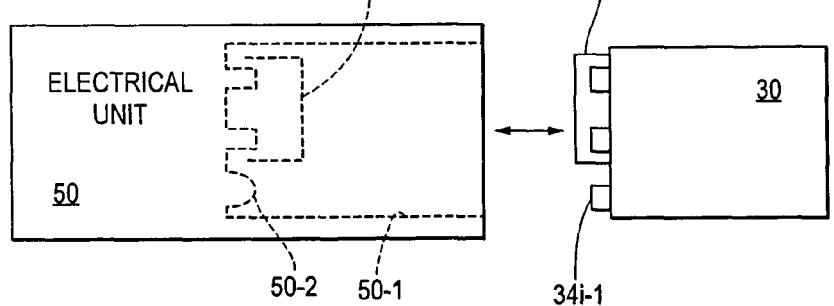
FIG. 3 illustrates an electrical unit of a type which could be energized by power generators in accordance with the invention.

FIG. 3 illustrates a respective electronic unit 50 with which a self-configuring generator such as the generator 30 can be used. A cavity 50-1 incorporates a selection member 50-2 which engages one of the pins or valve elements 34a-1, b-1, c-1, or d-1 of generator 30 when the generator is inserted into the cavity 50-1. In response to having selected a desired output power and thereby activating a selective plurality of fuel cells, current at a predetermined voltage can be coupled via electrodes 36 to terminals 50-3 of the electrical unit 50 thereby energizing same.

It will be understood that a variety of selection members, corresponding to the member 50-2 can be incorporated into selected electrical units to produce different motions or displacements, or close an electrical circuit as the respective generator such as a generator 30 as being inserted. Exemplary configurations can include electrically activated valves (solenoid activated, electro-statically activated or the like without limitation) which are triggered as the generator is being inserted into a respective cavity. Alternately, electrical energy, for example a heated member adjacent to or extending through a cover or seal can be used to perforate same and select a generator. RF heating could also be used. All such configurations come within the spirit and scope of the present invention.

In yet another aspect of the invention, as an alternate to being able to select a power level appropriate for an electronic device, an output voltage and/or current could also be automatically selected, based on the characteristics of the device, as the generator is being coupled to a respective electronic device by selectively coupling cells in series and/or parallel. As those of skill in the art will understand, the exact details of such selection structures are not limitations of the present invention.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

The invention claimed is:

1. A variable generator comprising:
   a housing;
   a plurality of unactivated fuel cells each with removable or pierceable seals, the removal or piercing of the seal activating the fuel cell, the plurality incorporated into the housing, the housing and cells are configured for insertion into a load and for providing a plurality of different power outputs when activated; and
   a moveable electrical output selector structure comprising removable or pierceable seals that selects an electrical output, each seal coupled to a respective member of the plurality of unactivated fuel cells, wherein at least a portion of the structure is mechanically activated by a selection member of the load upon insertion of the housing into the load to pierce or remove the seal, the unactivated portion automatically selects via insertion into the load at least one of output power, output current or output voltage.

2. A generator as in claim 1 where some members of the plurality are coupled in series.

3. A generator as in claim 1 where some members of the plurality are coupled in parallel.

4. A generator as in claim 1 where first groups of members of the plurality are coupled in series and where at least some of the groups are coupled in parallel.

5. A generator as in claim 4 where parallel coupled groups form second groups which provide the plurality of different power outputs.

6. A generator as in claim 1 where the output selector structure includes at least one of a switch, a valve, a piercable cover, or a removable cover.

7. A generator as in claim 6 where the output selector structure is responsive to at least one of an applied selection force, or a selected electrical circuit to thereby select the at least one of output power, output current, or output voltage.

8. A generator as in claim 7 where the selection force affects the plurality by at least one of a displacement, a deformation, a perforation or a separation of one portion of the plurality relative to another portion thereof.

9. A generator as in claim 8 where first groups of members of the plurality are coupled in series and where at least some of the groups are coupled in parallel.

10. A generator as in claim 9 where parallel coupled groups form second groups which provide the plurality of different power outputs.

11. A generator as in claim 1 where the members of the plurality and the power selection are configured as a replaceable power supply for an electrical unit.

12. A generator as in claim 8 where the members of the plurality and the power selection are configured as a replaceable power supply for an electrical unit; and
   where the electrical unit produces the selection force as the generator is coupled thereto.

13. A generator as in claim 12 where members of the plurality comprise fuel cells.

14. A power supply for an electrical unit comprising:
   a housing, a plurality of unactivated fuel cells each with a removable or pierceable seal, the removal or piercing of the seal activating the fuel cell, the plurality incorporated into the housing configured for insertion into an electrical unit, some of the cells are connected in series, others are connected in parallel to provide a plurality of electrical outputs and moveable selection structure comprising removable or pierceable seals that selects an electrical output, the moveable selection structure coupled to respective members of the plurality of unactivated fuel cells wherein at least a portion of the selection structure is mechanically activated by a selection member of the electrical unit upon insertion of the housing into the electrical unit to pierce or remove the seal thereby automatically selecting via insertion of the housing into the electrically unit an electrical output of the plurality of electrical outputs to energize the electrical unit.

15. A power supply as in claim 14 where the plurality comprises a replaceable element.

16. A power supply as in claim 15 which includes a structure carried by the element which mechanically selects at least one of an output power level, an output current or an output voltage.

17. A power supply as in claim 16 where the structure responds to a force from the electrical unit as the plurality is coupled thereto.

18. A power supply as in claim 16 where the structure selects an output power level in response to an applied force.

19. A power supply as in claim 16 where the structure includes at least one of a switch, a valve, a deformable member, a perforatable member, a movable member, or a tearable member.

20. A power supply as in claim 14 which includes at least one of a deformable member, a perforatable member, a movable member, or a tearable member, the member is associated with at least one of the unactivated cells, and is responsive to an applied force to expose a portion of the at least one cell to a gas to activate that cell to provide the selected output.

21. A power supply as in claim 1 where the selector structure exposes at least a portion of at least one of the unactivated cells to an ambient gas to activate at least the one cell to provide the selected output.

* * * * *